United States Patent
Klosowiak et al.

(10) Patent No.: US 6,891,991 B2
(45) Date of Patent: May 10, 2005

(54) OPTICAL PATH METHOD AND APPARATUS

(75) Inventors: Tomasz Klosowiak, Glenview, IL (US); Robert Lempkowski, Elk Grove Village, IL (US); Keryn K. Lian, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/413,644

(22) Filed: Apr. 15, 2003

(65) Prior Publication Data

US 2004/0208423 A1 Oct. 21, 2004

(51) Int. Cl.[7] .................................................. G02B 6/35
(52) U.S. Cl. ........................ 385/18; 438/459; 438/29; 257/415; 257/619
(58) Field of Search .............................. 385/18; 438/459, 438/29, 69, 7–9, 16, 27; 257/415, 619

(56) References Cited

U.S. PATENT DOCUMENTS

| 6,583,031 B2 * | 6/2003 | Lin ............................. 438/459 |
| 6,633,426 B2 * | 10/2003 | Shrauger et al. ............ 359/290 |
| 2003/0077028 A1 | 4/2003 | Lee et al. |

* cited by examiner

*Primary Examiner*—John R. Lee
*Assistant Examiner*—Zia R. Hashmi

(57) ABSTRACT

A mesoscale micro electro-mechanical systems (MEMS) structure comprises an optical interface member (18) that moves with a pivoting member (15). Such movement serves to occlude and/or to complete an optical signal pathway (19).

25 Claims, 2 Drawing Sheets

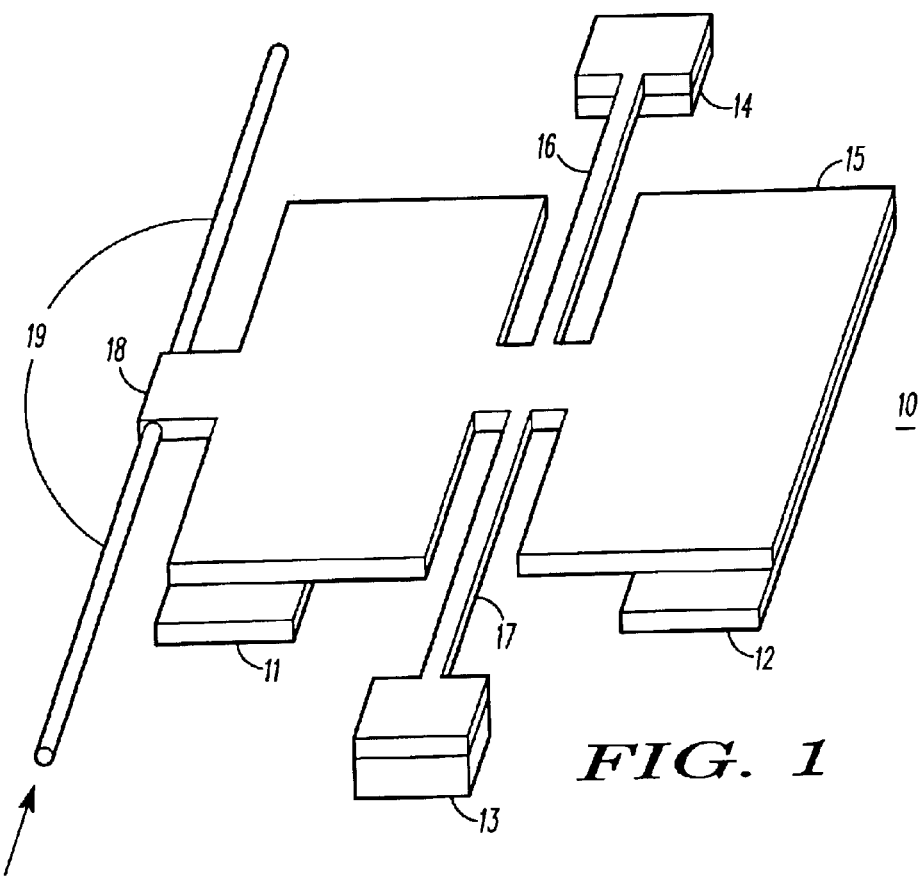
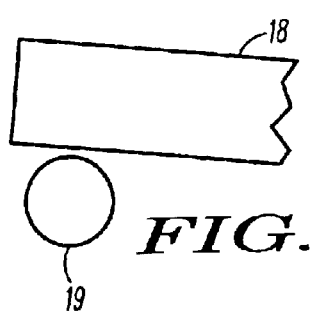
FIG. 1
FIG. 2
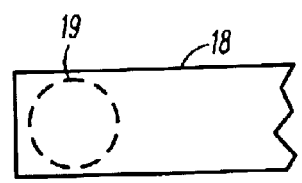
FIG. 3
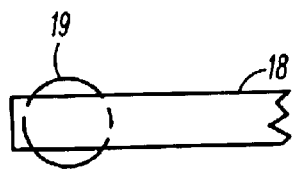
FIG. 4

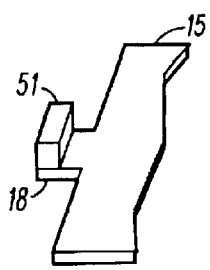
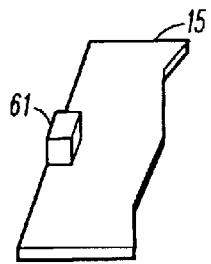
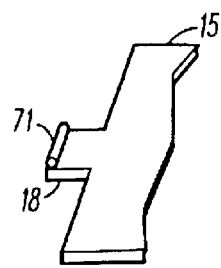
*FIG. 5*  *FIG. 6*  *FIG. 7*
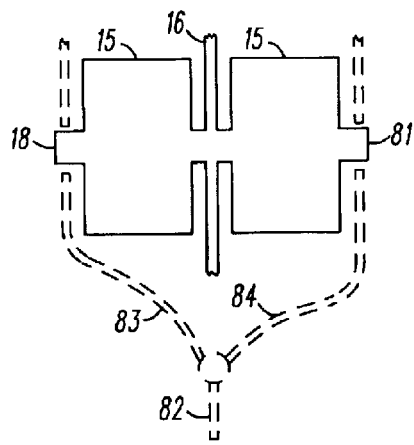
*FIG. 8*
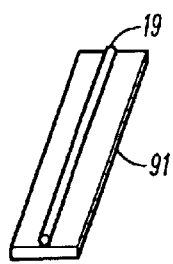
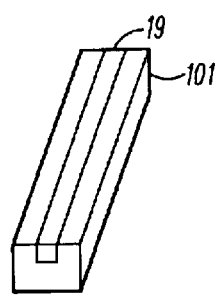
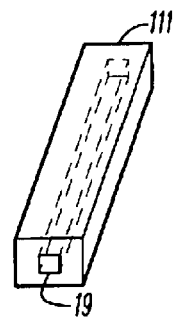
*FIG. 9*  *FIG. 10*  *FIG. 11*
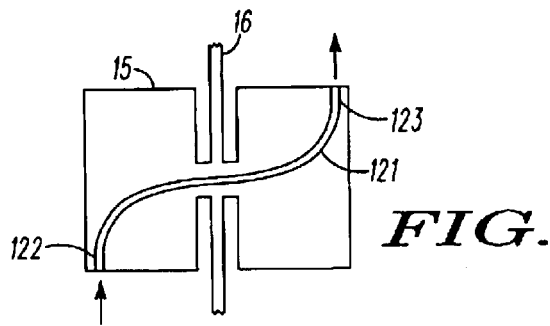
*FIG. 12*

OPTICAL PATH METHOD AND APPARATUS

TECHNICAL FIELD

This invention relates generally to optical paths and also to mesoscale micro electro-mechanical systems.

BACKGROUND

Conveyance of signaling via optical pathways (such as optical fibers) comprises a relatively well developed and well understood area of endeavor. Optical pathways are desirable in many settings for a variety of reasons including but not limited to characteristic generous bandwidth capacity. Notwithstanding a relatively well developed core of basic enabling technology in this regard, however, there are at least some areas where room for improvement exists.

Selectively terminating an optical signal path and/or re-routing an optical signal path are examples of such areas. While known techniques exist to effect such actions, such techniques tend to be relatively costly and/or require relatively large enabling structures.

Micro electro-mechanical systems are also known in the art and comprise, in general, miniaturized mechanical structures that are controlled by electricity and/or serve as an electrical component such as, but not limited to, a switch. To date, such technology has only served minimally to facilitate optical services. For example, small mirrors that comprise a part of a micro electro-mechanical system can be selectively moved to cause a commensurate movement of an incident light beam. Therefore, although holding considerable promise for various areas of application, micro electro-mechanical systems have not been particularly useful as applied to optical signal path control.

BRIEF DESCRIPTION OF THE DRAWINGS

The above needs are at least partially met through provision of the optical path method and apparatus described in the following detailed description, particularly when studied in conjunction with the drawings, wherein:

FIG. 1 comprises a perspective view as configured in accordance with an embodiment of the invention;

FIG. 2 comprises a detail side-elevational view as configured in accordance with an embodiment of the invention;

FIG. 3 comprises a detail side-elevational view as configured in accordance with an embodiment of the invention;

FIG. 4 comprises a detail side-elevational view as configured in accordance with another embodiment of the invention;

FIG. 5 comprises a detail perspective view as configured in accordance with an embodiment of the invention;

FIG. 6 comprises a detail perspective view as configured in accordance with another embodiment of the invention;

FIG. 7 comprises a detail perspective view as configured in accordance with yet another embodiment of the invention;

FIG. 8 comprises a detail top plan as configured in accordance with another embodiment of the invention;

FIG. 9 comprises a detail perspective as configured in accordance with an embodiment of the invention;

FIG. 10 comprises a detail perspective view as configured in accordance with another embodiment of the invention;

FIG. 11 comprises a detail perspective view as configured in accordance with yet another embodiment of the invention; and FIG. 12 comprises a detail top plan view as configured in accordance with yet another embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a mesoscale micro electro-mechanical system (micro electro-mechanical system (MEMS)) apparatus serves to selectively impact the optical coupling of at least a first and a second optical signal pathway. In a preferred embodiment, the mesoscale micro electro-mechanical system (MEMS) apparatus includes a support substrate, a pivoting member having an optical interface member that pivots between at least a first position and a second position with respect to the support substrate, and an elastic torsional member that is affixed with respect to both the pivoting member and the support substrate.

So configured, when the pivoting member is selectively placed in the first position the optical interface member is at least partially disposed between the first and second optical pathway to thereby at least partially affect passage of an optical signal from the first optical signal pathway to the second optical signal pathway in a first way. Similarly, when the pivoting member is selectively placed in the second position the optical interface member is at least substantially removed from between the first and second optical signal pathway to thereby at least partially affect passage of an optical signal from the first optical signal pathway to the second optical signal pathway in a second way, which second way is different from the first way.

In one embodiment, the first way can comprise, for example, partial or complete occlusion of the optical coupling link and the second way can comprise reduced or complete non-occlusion of the optical coupling link.

Small mesoscale micro electro-mechanical system (MEMS)-based optical devices can be readily provided using such approaches. Such resultant devices can be relatively small and also relatively inexpensive to fabricate. Further, these techniques are sufficiently flexible to permit support of a relatively wide variety of optical signal functions including, but not limited to, selective optical signal termination and optical signal re-routing.

In a preferred embodiment, such a mesoscale MEMS apparatus includes, as noted above, a pivoting member. The detailed description set forth below includes specific suggestions regarding the preferred configuration of such a pivoting member and the other corresponding elements of such an apparatus. Mesoscale fabrication techniques useful to facilitate fabrication of such an apparatus are known to those skilled in the art and include those techniques described in U.S. patent application Ser. No. 10/133,913, entitled Micro Electro-Mechanical System Method and filed by the owner hereof on Apr. 26, 2002, the contents of which are incorporated herein by this reference. In general, various mesoscale fabrication techniques, including various printed wiring board fabrication technologies, material (including both conductive and insulative materials) deposition, and material removal techniques are used to realize the structures described herein. For the sake of brevity and the preservation of focus, such fabrication details are not more specifically related here.

Referring now to the illustrations, and in particular to FIG. 1, in a preferred embodiment the apparatus is built upon and includes a support substrate 10 comprised of, for example, a printed wiring board. This printed wiring board can be comprised of a polymer carrier as provided through a variety of appropriate materials, including but not limited to FR-2 through FR-6, polyimide, CEM-1 through CEM-8, G-10 (an epoxy/woven glass material), modified epoxies, BT epoxy, cyanate ester, polytetrafluoroethylene (Teflon), and so forth as is well understood in the art. The support substrate 10 is depicted as being without specific boundaries or thickness as such parameters are readily chosen to suit the needs of a given context and set of design requirements as is also well understood in the art.

In this embodiment, two conductive control surfaces 11 and 12 are disposed on the support substrate 10. These conductive control surfaces can comprise, for example, copper traces formed in a desired pattern or shape (in a typical operational embodiment, other conductive traces would preferably be coupled to these control surfaces and would serve to permit selective application of a voltage potential thereto in accordance with well understood prior art technique; these and other similar control-signal traces are not shown in these views for the sake of simplicity and clarity). As will be shown below, when selectively energized, these conductive members cause a pivoting member to become disposed in a desired position and orientation.

A pair of posts 13 and 14 comprised preferably of an insulating material are also disposed on the support substrate 10. These posts serve as support blocks and specifically support the elastic torsional members described below.

In this embodiment, the pivoting member 15 comprises a conductive member formed, for example, of a thin layer of copper or other suitable conductive material. Two appendages 16 and 17 extend laterally therefrom and comprise elastic torsional members. In this embodiment, these appendages 16 and 17 are formed integral to the pivoting member 15 and are further substantially coplanar with respect to the pivoting member 15. The elastic torsional members are coupled at their terminal ends to the support blocks 13 and 14, respectively, referred to earlier.

So configured, the pivoting member 15 is held in suspension a small distance above the support substrate 10. By selective application of a voltage potential difference the conductive material comprising the pivoting member 15 and either of the conductive control surfaces 11 or 12, the pivoting member 15 can be caused to pivot towards the corresponding conductive control surface and thereby cause a repositioning of the pivoting member 15. With respect to the view depicted in FIG. 1, and in this embodiment, the pivoting member 15 can be caused to pivot downwardly and towards the left by applying a voltage potential difference between the pivoting member 15 and the left-side conductive member 11 and downwardly and towards the right by applying a voltage potential difference between the pivoting member 15 and the right-side conductive member 12.

The amount of voltage potential difference required to effect this repositioning of the pivoting member 15 and/or the speed by which such repositioning will occur will vary with various parameters, such as the surface area of the relevant components and the distance between such components as well as actuation voltage and the spring constant of members 16 and 17 as is well understood in the art.

In a preferred embodiment, the elastic torsional members 16 and 17 effectively extend inwardly of the outer perimeter envelope of the pivoting member 15 itself. So configured, the elasticity and resilience of the combined pivoting member/elastic torsional members can be adjusted to suit the needs of a given application. In general, the deeper the elastic torsional members extend into the pivoting member, the less electrical force is required to effect a desired movement of the pivoting member 15 as otherwise described above.

The pivoting member 15 also includes, in this embodiment, an optical interface member 18. In this particular embodiment, the optical interface member 18 comprises a light occluding member that, when properly positioned, can selectively block an optical signal pathway 19 (such an optical signal pathway 19 can be realized in a variety of ways including through use of a light-bearing fiber or other optical guide as is presently known or hereafter developed).

To illustrate, and referring momentarily to FIG. 2, the optical interface member 18 can be positioned to permit light to pass unimpeded through the optical signal pathway 19 (the optical interface member 18 can be withdrawn from the occluding position in the embodiment depicted, for example, by energizing an appropriate conductive member 12 to pivot the pivoting member 15 and hence the optical interface member 18 away from the optical signal pathway 19). Referring now momentarily to FIG. 3, the optical interface member 18 can also be positioned to permit the member 18 to occlude the optical signal pathway 19 (this position can be occasioned, for example, by de-energizing the conductive members 11 and 12 and permitting the pivoting member 15 to re-assume through resilience of the elastic torsional members 16 and 17 a quiescent orientation that coincides with the desired positioning of the optical interface member 18). By another approach, actuating voltage can be alternated between one conductive member 11 and the other conductive member 12 to cause such movement and positioning; by always requiring that one conductive member or the other be energized during periods of active operation, better vibration immunity during switch operation may likely result.

In the illustrative examples just provided, the optical interface member 18 either fully occludes the optical signal pathway 19 or is fully withdrawn therefrom. Such an embodiment can serve a variety of useful purposes. There may be applications, however, when only partial occlusion may be desired. In such a case, and referring now momentarily to FIG. 4, the optical interface member 18 can be configured such that only partial occlusion of the optical signal pathway 19 results. For example, as illustrated, the optical interface member 18 can be thinner than the optical signal pathway 19, thereby permitting some light to pass around the optical interface member 18. Another way to achieve a similar result would be to position the optical interface member 18 so as to only partially extend within the optical interface of the optical signal pathway 19.

In the embodiments described above, the optical interface member 18 essentially comprises a planar extension, such as a tab, of the pivoting member 15 itself. Other configurations are of course possible and perhaps desirable to suit the needs of a given application. For example, with reference to FIG. 5, the tab extension of the optical interface member 18 can have additional material 51 disposed thereon to increase the size of the occluding profile. Such additional material 51 can be comprised of any suitable material, including both conductive and non-conductive materials, but should in general be comprised of substantially optically opaque material and/or have a suitably opaque covering at least partially disposed thereover. As another example, and referring now to FIG. 6, the optical interface member can be comprised of a built-up area 61 on the pivoting member 15 such that no tab or other planar extension is provided. Such a form factor may be more appropriate for certain applications.

In the embodiments described above, the optical interface member 18 has comprised an occluding surface having a variety of forms. For some purposes, however, it may be desired to provide an optical interface member 18 that permits, rather than prevents, optical transmission. For example, and referring now to FIG. 7, a light-bearing pathway such as optical signal pathway bridge 71 can be disposed on the tab extension described above. When the optical interface member 18 is selectively positioned to permit this light-bearing pathway 71 within an open-space portion of the optical signal pathway 19, a completed light path then substantially results and the flow of light through the optical signal pathway 19 can proceed as a result.

In the embodiments described above, the pivoting member 15 features a single optical interface member 18. If desired, additional optical interface members can be included with a single pivoting member. For example, and referring now to FIG. 8, a single pivoting member 15 can have a first optical interface member 18 and a second optical interface member 81 on an opposing side of the pivoting member 15. Such a configuration can be used in a variety of ways. For example, as one illustration, a source optical signal pathway 82 can be split between two optical signal pathways 83 and 84 and the two optical interface members 18 and 81 can be used to control the continued passage of the split optical signals along such pathways 83 and 84. As one approach, both optical signal pathways 83 and 84 could be occluded by the optical interface members 18 and 81 when the pivoting member 15 is at rest. Upon energizing either of the above-described conductive members 11 and 12 (as shown in FIG. 1), however, the pivoting member 15 will pivot and therefore withdraw the two optical interface members 18 and 81 from their occluding positions. (Again, where increased immunity to vibration is appropriate, desired positioning of the pivoting member 15 can be rendered dependent upon an active state as versus a quiescent state of one or the other of the conductive members 11 and 12.)

As described above, the optical signal pathway used in conjunction with such embodiments can comprise an optical fiber or other suitable optical signal guide. With reference to FIG. 9, such an optical signal pathway 19 can be disposed on a supporting surface 91 (which supporting surface 91 may be the same as the support substrate 10 in some embodiments or may be another structure as is built upon the support substrate 10 in accordance with well understood prior art technique). Or, in another embodiment, and referring now to FIG. 10, the optical signal pathway 19 can be partially embedded in a supporting surface 101 or, and referring now to FIG. 11, can be fully embedded in a supporting surface 111. Depending upon the embodiment selected, of course, it may be necessary to remove some of the supporting surface material in order to provide access for the corresponding optical interface member.

These various embodiments can be utilized in various ways to achieve a cost effective and relatively small optical signal path control device. Since the described embodiments are configured on a mesoscale, the resultant device will typically have perimeter dimensions on the order of from about ten to a few hundred mils and again, are readily fabricated using known and relatively inexpensive printed wiring board processing and fabrication methods and techniques.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, and referring now to FIG. 12, the optical interface member can include an optical signal pathway 121 that is disposed on (or in) the pivoting member 15 with one end 122 of the optical signal pathway 121 being disposed on one side of the pivoting member 15 and the remaining end 123 of the optical signal pathway 121 being disposed on an opposing end of the pivoting member 15. So configured, pivoting of the pivoting member 15 can be utilized to align both ends 122 and 123 of the optical signal pathway 121 with in an input and an output pathway (not shown) or to break that alignment as desired to control optical coupling of the input and output pathways.

We claim:

1. An apparatus comprising:
    a first optical signal pathway;
    a second optical signal pathway;
    a mesoscale micro electro-mechanical system (MEMS) apparatus comprising:
        a support substrate;
        a pivoting member having an optical interface member and selectively pivoting between at least a first position and a second position with respect to the support substrate;
        an elastic torsional member being affixed with respect to both the pivoting member and the support substrate;
    such that:
        when the pivoting member is selectively placed in the first position the optical interface member is at least partially disposed between the first and second optical signal pathway to thereby at least partially affect passage of an optical signal from the first optical signal pathway to the second optical signal pathway in a first way; and
        when the pivoting member is selectively placed in the second position the optical interface member is at least substantially removed from between the first and second optical signal pathway to thereby at least partially affect passage of an optical signal from the first optical signal pathway to the second optical signal pathway in a second way, which second way is different from the first way.

2. The apparatus of claim 1 wherein the first optical signal pathway comprises a light-bearing fiber.

3. The apparatus of claim 1 wherein the first optical signal pathway is embedded within the support substrate.

4. The apparatus of claim 1 wherein the first optical signal pathway is disposed on the support substrate.

5. The apparatus of claim 2 wherein the second optical signal pathway also comprises a light-bearing fiber.

6. The apparatus of claim 1 wherein the support substrate comprises a printed wiring board.

7. The apparatus of claim 1 wherein the mesoscale micro electro-mechanical system (MEMS) apparatus further comprises at least a first support block disposed on the support substrate and wherein the elastic torsional member is affixed to the first support block.

8. The apparatus of claim 1 wherein the elastic torsional member includes at least a first elastic member and a second elastic member.

9. The apparatus of claim 8 wherein the first elastic member is disposed on a first side of the pivoting member and the second elastic member is disposed on a second side of the pivoting member, which second side is opposite to the first side.

10. The apparatus of claim 9 wherein the mesoscale micro electro-mechanical system (MEMS) apparatus further comprises at least a first support block and a second support block disposed on the support substrate and wherein the first elastic member is affixed to the first support block and the second elastic member is affixed to the second support block.

11. The apparatus of claim 1 wherein the optical interface member comprises a light occluding member.

12. The apparatus of claim 1 wherein the optical interface member comprises a light-bearing pathway.

13. The apparatus of claim 1 wherein the elastic torsional member is at least substantially comprised of metal.

14. The apparatus of claim 1 and further comprising at least a first conductive member disposed in a fixed relationship with respect to the support substrate.

15. The apparatus of claim 14 wherein the pivoting member includes a second conductive member, such that energizing at least one of the first and second conductive member causes the pivoting member to become disposed in the first position.

16. The apparatus of claim 15 and further comprising at least a third conductive member disposed in a fixed relationship with respect to the support substrate, such that energizing at least one of the second and third conductive member causes the pivoting member to become disposed in the second position.

17. An optical switch apparatus comprising:
a first optical signal pathway;
a second optical signal pathway;
a mesoscale micro electro-mechanical system (MEMS) apparatus comprising:
  a printed wiring board support substrate having a first and second electrically conductive pad;
  a pivoting member having:
    an electrically conductive portion; and
    an optical interface member;
  wherein the pivoting member is selectively pivotable between at least a first position and a second position with respect to the support substrate;
  an elastic torsional member being affixed with respect to both the pivoting member and the support substrate, such that the elastic torsional member tends to elastically urge the pivoting member away from the first position;
such that:
  when the first electrically conductive pad and the electrically conductive portion of the pivoting member have a first predetermined electrical relationship, the pivoting member is selectively placed in the first position such that the optical interface member is at least partially disposed between the first and second optical signal pathway to thereby at least partially affect passage of an optical signal from the first optical signal pathway to the second optical signal pathway in a first way; and
  when the second electrically conductive pad and the electrically conductive portion have a second predetermined electrical relationship the pivoting member is selectively placed in the second position such that the optical interface member is at least substantially removed from between the first and second optical signal pathway to thereby at least partially affect passage of an optical signal from the first optical signal pathway to the second optical signal pathway in a second way, which second way is different from the first way.

18. The optical switch apparatus of claim 17 wherein the first and second optical signal pathways are comprised of light-bearing fiber.

19. The optical switch apparatus of claim 17 wherein the first predetermined electrical relationship includes a voltage potential difference between the first electrically conductive pad and the electrically conductive portion.

20. The optical switch apparatus of claim 17 wherein the second predetermined electrical relationship includes a voltage potential difference between the second electrically conductive pad and the electrically conductive portion.

21. A method comprising:
providing a substrate;
providing a light path having an open-space portion, wherein the light path has a substantially fixed relationship to the substrate;
providing a pivoting mesoscale micro electro-mechanical system (MEMS) member that selectively pivots in at least a first direction with respect to the substrate and in opposition to an elastic torsional force such that the pivoting mesoscale micro electro-mechanical system (MEMS) member is at least selectively pivotable between a first position and a second position;
selectively moving the pivoting mesoscale micro electro-mechanical system (MEMS) member to the first position to thereby cause at least a portion of the pivoting mesoscale micro electro-mechanical system (MEMS) member to become disposed within the open-space portion of the light path.

22. The method of claim 21 and further comprising selectively moving the pivoting mesoscale micro electro-mechanical system (MEMS) member to the second position to thereby cause the pivoting mesoscale micro electro-mechanical system (MEMS) member to become at least substantially withdrawn from the open-space portion of the light path.

23. The method of claim 21 and further comprising providing at least one electrically conductive member, and wherein selectively moving the pivoting mesoscale micro electro-mechanical system (MEMS) member to the first position includes selectively causing a predetermined electrical relationship between the at least one electrically conductive member and the pivoting mesoscale micro electro-mechanical system (MEMS) member.

24. The method of claim 21 wherein selectively moving the pivoting mesoscale micro electro-mechanical system (MEMS) member to the first position to thereby cause at least a portion of the pivoting mesoscale micro electro-mechanical system (MEMS) member to become disposed within the open-space portion of the light path includes occluding at least a portion of the light path.

25. The method of claim 21 wherein selectively moving the pivoting mesoscale micro electro-mechanical system (MEMS) member to the first position to thereby cause at least a portion of the pivoting mesoscale micro electro-mechanical system (MEMS) member to become disposed within the open-space portion of the light path includes at least substantially completing the light path.

* * * * *